US010933593B2

(12) United States Patent
Koelling et al.

(10) Patent No.: US 10,933,593 B2
(45) Date of Patent: Mar. 2, 2021

(54) SINTERED AND POROUS ARTICLES HAVING IMPROVED FLEXURAL STRENGTH

(71) Applicant: Celanese Sales Germany GmbH, Taunus (DE)

(72) Inventors: Lars Koelling, Mannheim (DE); Christina Schmid, Darmstadt (DE); Christian Meermann, Kelkheim (DE)

(73) Assignee: Celanese Sales Germany GmbH, Taunus (DE)

( * ) Notice: Subject to any disclaimer, the term of this patent is extended or adjusted under 35 U.S.C. 154(b) by 156 days.

(21) Appl. No.: 16/117,688

(22) Filed: Aug. 30, 2018

(65) Prior Publication Data
US 2019/0070795 A1 Mar. 7, 2019

Related U.S. Application Data

(60) Provisional application No. 62/553,401, filed on Sep. 1, 2017.

(51) Int. Cl.
*B29C 67/20* (2006.01)
*C08J 9/24* (2006.01)
*C02F 1/00* (2006.01)
*B01D 69/02* (2006.01)
*C02F 3/20* (2006.01)
*C08J 9/00* (2006.01)
*B01D 39/16* (2006.01)
*B01D 67/00* (2006.01)
*B43K 1/00* (2006.01)
*B01D 71/26* (2006.01)
*B29C 67/04* (2017.01)
*C08F 210/02* (2006.01)
*C08L 23/06* (2006.01)
*C02F 103/10* (2006.01)
*C02F 101/32* (2006.01)
*C02F 103/44* (2006.01)
*C02F 103/02* (2006.01)
*B29L 31/14* (2006.01)
*B29L 31/00* (2006.01)

(52) U.S. Cl.
CPC .......... *B29C 67/20* (2013.01); *B01D 39/1661* (2013.01); *B01D 67/0002* (2013.01); *B01D 69/02* (2013.01); *B01D 71/26* (2013.01); *B29C 67/04* (2013.01); *B43K 1/006* (2013.01); *C02F 1/001* (2013.01); *C02F 3/20* (2013.01); *C08F 210/02* (2013.01); *C08J 9/0061* (2013.01); *C08J 9/24* (2013.01); *C08L 23/06* (2013.01); *B01D 2239/10* (2013.01); *B01D 2325/24* (2013.01); *B01D 2325/34* (2013.01); *B29K 2023/06* (2013.01); *B29L 2031/14* (2013.01); *B29L 2031/725* (2013.01); *B29L 2031/748* (2013.01); *C02F 2101/32* (2013.01); *C02F 2101/325* (2013.01); *C02F 2103/023* (2013.01); *C02F 2103/10* (2013.01); *C02F 2103/44* (2013.01); *C08F 2500/02* (2013.01); *C08F 2500/05* (2013.01); *C08F 2500/18* (2013.01); *C08F 2500/24* (2013.01); *C08J 2323/06* (2013.01); *C08J 2423/06* (2013.01); *C08L 2205/025* (2013.01); *C08L 2207/068* (2013.01); *C08L 2314/02* (2013.01); *Y10T 428/249979* (2015.04)

(58) Field of Classification Search
CPC .. B29C 67/20; B29C 67/04; C08J 9/24; C08J 2323/06; B01D 39/1661; B01D 2325/34; C08L 23/06
See application file for complete search history.

(56) References Cited

U.S. PATENT DOCUMENTS

| 3,297,805 | A | 1/1967 | Rottig et al. |
|---|---|---|---|
| 4,731,199 | A | 3/1988 | Matsuo et al. |
| 4,925,880 | A | 5/1990 | Stein |
| 5,292,584 | A | 3/1994 | Howard et al. |
| 5,453,234 | A | 9/1995 | Gusik |
| 6,743,388 | B2 | 6/2004 | Sridharan et al. |
| 2005/0035481 | A1 | 2/2005 | Rastogi et al. |
| 2012/0289667 | A1 | 11/2012 | Lukesova et al. |
| 2013/0046040 | A1* | 2/2013 | Srinivasan ............... C08F 10/02 521/143 |
| 2013/0046044 | A1 | 2/2013 | Kaya |
| 2013/0090400 | A1 | 4/2013 | Robert |
| 2014/0004339 | A1 | 1/2014 | Ehlers et al. |
| 2014/0048741 | A1* | 2/2014 | Prince .................. B01J 20/3007 252/184 |

(Continued)

FOREIGN PATENT DOCUMENTS

| CN | 102632616 A | 8/2012 |
|---|---|---|
| EP | 2889153 | 7/2015 |

OTHER PUBLICATIONS

PCT/IB2018/056650, International Search Report and Written Opinion, dated Nov. 6, 2018, 13 pages.

(Continued)

*Primary Examiner* — Hai Vo

(74) *Attorney, Agent, or Firm* — Dority & Manning, P.A.

(57) ABSTRACT

Polymer compositions containing polyethylene particles having a multi-modal molecular weight distribution are disclosed. The polymer compositions are well suited to producing porous substrates through a sintering process. Formulations made according to the present disclosure can produce porous substrates having improved flexibility demonstrated by an increased flexural strength while still retaining excellent pressure drop characteristics.

13 Claims, No Drawings

(56) References Cited

U.S. PATENT DOCUMENTS

2014/0054217 A1    2/2014   Gusik et al.
2014/0212612 A1    7/2014   Sbriglia

OTHER PUBLICATIONS

Lyondellbasell, Technical Data Sheet, Lupolen UHM 5000, Ultra High Molecular Weight Polyethylene, Jun. 23, 2017, 4 pages.
Ticona, Product Information Sheet, GUR® GHR 8020/PE/Specialty, Jan. 24, 2007, 2 pages.
Ticona, Product Information Sheet, GUR® GHR 8110/PE/Unfilled, Jan. 24, 2007, 3 pages.

* cited by examiner

SINTERED AND POROUS ARTICLES HAVING IMPROVED FLEXURAL STRENGTH

RELATED APPLICATIONS

The present application is based on and claims priority to U.S. Provisional Application Ser. No. 62/553,401, having a filing date of Sep. 1, 2017, which is incorporated herein by reference in its entirety.

BACKGROUND

Ultra-high-molecular weight polyethylene (UHMW-PE), high-density polyethylene (HDPE) and low-density polyethylene (LDPE) have all been used to produce porous molded articles. Examples of such articles include filter funnels, immersion filters, filter crucibles, porous sheets, pen tips, marker nibs, aerators, diffusers and light weight molded parts.

LDPE and HDPE, which include polyethylenes of molecular weight up to 250,000 g/mol, yield good part strength but their melt behavior results in a narrow processing window with respect to both time and temperature. As result, molded articles produced therefrom tend to be of reduced porosity and inconsistent quality. Furthermore, with LDPE or HDPE as the molding material, non-uniformity of heating within molds having complex geometric conduits tends to result in non-uniformity in the porosity of the molded article.

In contrast to LDPE and HDPE, UHMW-PE formulations, with an average molecular weight above 2,500,000 g/mol, can be processed over a wide range of time and temperature. Moreover, these high molecular weight polyethylenes are valued for properties such as chemical resistance, impact resistance, abrasion resistance, water absorption, energy absorption, heat deflection, and sound-dampening capabilities. However, since UHMW-PE seldom exhibits flowability even in the molten state, processing by conventional techniques, such as injection molding, is difficult. In addition, porous articles produced from UHMW-PE tend to be weak and brittle.

Unfortunately, however, when steps are typically taken in order to increase the flexibility and reduce the stiffness of porous articles made from UHMW-PE, other properties of the product are adversely affected. For instance, when steps are taken to increase flexibility, the filter properties of the material can be degraded leading to porous products having an unsuitable pressure drop when placed in used.

In view of the above, a need currently exists for a polyethylene polymer composition that can be used to produce porous products containing an ultrahigh molecular weight polyethylene that is flexible and not overly rigid. A need also exists for an improved polyethylene composition for forming sintered and porous articles that have increased flexibility without degrading the filter properties of the article and/or without creating an article having a relatively high pressure drop.

SUMMARY

In general, the present disclosure is directed to a polymer composition containing polyethylene particles that includes a relatively high molecular weight polyethylene for producing porous articles that not only have good filtration properties but are also flexible. The present disclosure is also directed to flexible and porous polymer articles made from a relatively high molecular weight polyethylene polymer that, when tested, has a relatively low pressure drop indicating that fluids can filter through the material without requiring substantial amounts of energy for fluid flow.

In one embodiment, for instance, the present disclosure is directed to a polymer article comprising a porous substrate comprised of polyethylene particles sintered together. The polyethylene particles comprise one or more polyethylene polymers having a multi-modal molecular weight distribution. For instance, at least 50% by weight of the polyethylene polymers have an average molecular weight of greater than about 3,500,000 g/mol. Less than about 50% by weight of the polyethylene polymers, on the other hand, have an average molecular weight of less than about 1,500,000 g/mol.

In accordance with the present disclosure, the porous substrate can have excellent filter properties in addition to remaining very flexible. For example, the porous substrate can have a mean pore size of from about 50 microns to about 300 microns, such as from about 80 microns to about 200 microns. In addition, the flexible substrate can have a flexural strength of greater than about 2 MPa, such as greater than about 2.2 MPa, such as greater than about 2.4 MPa, such as greater than about 2.6 MPa. With the above flexibility characteristics, the porous substrate can have a pressure drop of less than 10 mbar, such as less than about 8 mbar, such as less than about 6 mbar, such as even less than about 4 mbar. In one embodiment, the porous substrate can also have a porosity of from about 30% to about 60%.

As described above, the polymer composition of the present disclosure used to produce the porous substrate can have a multi-modal molecular weight distribution, such as a bi-modal molecular weight distribution. In one embodiment, for instance, the polymer composition includes a relatively high molecular weight polyethylene polymer combined with a relatively low molecular weight polymer. The relatively high molecular weight polyethylene polymer can be present in the composition in an amount from about 65% by weight to about 99% by weight, such as in an amount from about 75% by weight to about 85% by weight (based on the total weight of the polyethylene polymers). The high molecular weight polyethylene polymer, for instance, can have an average molecular weight of greater than about 4,000,000 g/mol, such as greater than about 4,500,000 g/mol, such as greater than about 5,000,000 g/mol.

The polyethylene polymer having a relatively low molecular weight, on the other hand, can be present in the composition in an amount from about 1% to about 35% by weight, such as in an amount from about 15% to about 25% by weight (based on the total weight of the polyethylene polymers). The relatively low molecular weight polymer can have a molecular weight of less than about 1,000,000 g/mol, such as less than about 500,000 g/mol.

In one particular embodiment, the polymer composition used to produce the porous substrate can be made from polyethylene particles having a bi-modal molecular weight distribution wherein from about 70% to about 90% by weight of the polymers have a molecular weight of greater than about 4,700,000 g/mol and wherein from about 10% to about 30% by weight of the polymers have an average molecular weight of from about 300,000 g/mol to about 500,000 g/mol. In one embodiment, the relatively high molecular weight polyethylene polymer may comprise a metallocene catalyzed polymer. The relatively low molecular weight polyethylene polymer, on the other hand, may comprise a Ziegler-Natta catalyzed polyethylene polymer. In one embodiment, the relatively low molecular weight polymer can have a bulk density of from about 0.36 g/cm³ to about 0.54 g/cm³.

The porous substrate of the present disclosure can be used in numerous and diverse applications. In one embodiment, for instance, the porous substrate can be used as a filter element for filtering various fluids, such as gases and liquids. In an alternative embodiment, the porous substrate can be used as a nib for a writing instrument. In still another embodiment, the porous substrate may be used as an aerator for wastewater.

Other features and aspects of the present disclosure are discussed in greater detail below.

DETAILED DESCRIPTION

It is to be understood by one of ordinary skill in the art that the present discussion is a description of exemplary embodiments only, and is not intended as limiting the broader aspects of the present disclosure.

In general, the present disclosure is directed to polymer compositions containing polyethylene particles well suited to forming porous substrates when subjected to a sintering process. More particularly, the present disclosure is directed to increasing the flexural strength of a sintered and porous polymer substrate that incorporates a relatively high molecular weight polyethylene polymer. In the past, for instance, attempts to increase the flexural strength of porous substrates made from high molecular weight polyethylene polymers has resulted in a degradation of the porous properties of the substrate leading to unacceptably high fluid pressure drops. The pressure drop of ultrahigh molecular weight polyethylene sintered substrates, for example, is dependent upon a number of parameters of the polymer powder. The challenge is to increase the flexural strength of the product without increasing the pressure drop characteristics of the product. It was discovered, however, that combining a lower molecular weight polymer with the relatively high molecular weight polymer in order to produce a multi-modal molecular weight distribution can significantly increase flexural strength while unexpectedly and surprisingly maintaining low pressure drop values.

In this regard, the present disclosure is directed to polymer compositions containing polyethylene particles wherein the particles are formed from at least one polymer having a multi-modal molecular weight distribution. For example, in one embodiment, the polymer composition can contain a relatively high molecular weight component combined with a relatively low molecular weight component.

The one or more polyethylene polymers used to produce the composition of the present disclosure can comprise homopolymers or copolymers of ethylene. In one embodiment, for instance, the composition is made entirely of polyethylene homopolymers. Alternatively, at least one of the polyethylene polymers can comprise a polyethylene copolymer. For instance, the polyethylene may be a copolymer of ethylene and another olefin containing from 3 to 16 carbon atoms, such as from 3 to 10 carbon atoms, such as from 3 to 8 carbon atoms. These other olefins include, but are not limited to, propylene, 1-butene, 1-pentene, 1-hexene, 1-heptene, 1-octene, 4-methylpent-1-ene, 1-decene, 1-dodecene, 1-hexadecene and the like. Also utilizable herein are polyene comonomers such as 1,3-hexadiene, 1,4-hexadiene, cyclopentadiene, dicyclopentadiene, 4-vinylcyclohex-1-ene, 1,5-cyclooctadiene, 5-vinylidene-2-norbornene and 5-vinyl-2-norbornene. However, when present, the amount of the non-ethylene monomer(s) in the copolymer may be less than about 10 mol. %, such as less than about 5 mol. %, such as less than about 2.5 mol. %, such as less than about 1 mol. %, wherein the mol. % is based on the total moles of monomer in the polymer.

In one embodiment, the composition contains very little or no non-polyethylene polymers. For instance, the amount of non-polyethylene polymers present in the composition may be less than about 10% by weight, such as less than about 5% by weight, such as less than about 2.5% by weight, such as less than about 1% by weight.

Any method known in the art can be utilized to synthesize the polyethylene polymers. The polyethylene powder is typically produced by the catalytic polymerization of ethylene monomer or optionally with one or more other 1-olefin co-monomers, the 1-olefin content in the final polymer being less or equal to 10% of the ethylene content, with a heterogeneous catalyst and an organo aluminum or magnesium compound as cocatalyst. The ethylene is usually polymerized in gaseous phase or slurry phase at relatively low temperatures and pressures. The polymerization reaction may be carried out at a temperature of between 50° C. and 100° C. and pressures in the range of 0.02 and 2 MPa.

The molecular weight of the polyethylene can be adjusted by adding hydrogen. Altering the temperature and/or the type and concentration of the co-catalyst may also be used to fine tune the molecular weight. Additionally, the reaction may occur in the presence of antistatic agents to avoid wall fouling and product contamination.

Suitable catalyst systems include but are not limited to Ziegler-Natta type catalysts and/or metallocene catalysts. Typically Ziegler-Natta type catalysts are derived by a combination of transition metal compounds of Groups 4 to 8 of the Periodic Table and alkyl or hydride derivatives of metals from Groups 1 to 3 of the Periodic Table. Transition metal derivatives used usually comprise the metal halides or esters or combinations thereof. Exemplary Ziegler-Natta catalysts include those based on the reaction products of organo aluminum or magnesium compounds, such as for example but not limited to aluminum or magnesium alkyls and titanium, vanadium or chromium halides or esters. The heterogeneous catalyst might be either unsupported or supported on porous fine grained materials, such as silica or magnesium chloride. Such support can be added during synthesis of the catalyst or may be obtained as a chemical reaction product of the catalyst synthesis itself.

In one embodiment, a suitable catalyst system could be obtained by the reaction of a titanium(IV) compound with a trialkyl aluminum compound in an inert organic solvent at temperatures in the range of −40° C. to 100° C., preferably −20° C. to 50° C. The concentrations of the starting materials are in the range of 0.1 to 9 mol/L, preferably 0.2 to 5 mol/L, for the titanium(IV) compound and in the range of 0.01 to 1 mol/L, preferably 0.02 to 0.2 mol/L for the trialkyl aluminum compound. The titanium component is added to the aluminum component over a period of 0.1 min to 60 min, preferably 1 min to 30 min, the molar ratio of titanium and aluminum in the final mixture being in the range of 1:0.01 to 1:4.

In another embodiment, a suitable catalyst system is obtained by a one or two-step reaction of a titanium(IV) compound with a trialkyl aluminum compound in an inert organic solvent at temperatures in the range of −40° C. to 200° C., preferably −20° C. to 150° C. In the first step, the titanium(IV) compound is reacted with the trialkyl aluminum compound at temperatures in the range of −40° C. to 100° C., preferably −20° C. to 50° C. using a molar ratio of titanium to aluminum in the range of 1:0.1 to 1:0.8. The concentrations of the starting materials are in the range of 0.1 to 9.1 mol/L, preferably 5 to 9.1 mol/L, for the titanium (IV) compound and in the range of 0.05 and 1 mol/L, preferably 0.1 to 0.9 mol/L for the trialkyl aluminum compound. The titanium component is added to the aluminum compound over a period of 0.1 min to 800 min, preferably 30 min to 600 min. In a second step, if applied, the reaction product obtained in the first step is treated with a trialkyl aluminum compound at temperatures in the range of −10° C. to 150° C., preferably 10° C. to 130° C. using a molar ratio of titanium to aluminum in the range of 1:0.01 to 1:5.

In yet another embodiment, a suitable catalyst system is obtained by a procedure wherein, in a first reaction stage, a magnesium alcoholate is reacted with a titanium chloride in an inert hydrocarbon at a temperature of 50° to 100° C. In a second reaction stage, the reaction mixture formed is subjected to heat treatment for a period of about 10 to 100 hours at a temperature of 110° to 200° C. accompanied by evolution of alkyl chloride until no further alkyl chloride is evolved, and the solid is then freed from soluble reaction products by washing several times with a hydrocarbon.

In a further embodiment, catalysts supported on silica, such as for example the commercially available catalyst system Sylopol 5917 can also be used.

In one embodiment, especially when producing a relatively high molecular weight polyethylene, a metallocene-type catalyst may be used. For example, in one embodiment, two different metallocene-type catalysts can be used to produce the polyethylene polymer. For instance, the metallocene catalysts may be made from metals, such as hafnium and/or chromium.

Using such catalyst systems, the polymerization is normally carried out in suspension at low pressure and temperature in one or multiple steps, continuous or batch. The polymerization temperature is typically in the range of 30° C. to 130° C., preferably in the range of 50° C. and 90° C. and the ethylene partial pressure is typically less than 10 MPa, preferably 0.05 and 5 MPa. Trialkyl aluminums, like for example but not limited to isoprenyl aluminum and triisobutyl aluminum, are used as co-catalyst such that the ratio of Al:Ti (co-catalyst versus catalyst) is in the range of 0.01 to 100:1, more preferably in the range of 0.03 to 50:1. The solvent is an inert organic solvent as typically used for Ziegler type polymerizations. Examples are butane, pentane, hexane, cyclohexene, octane, nonane, decane, their isomers and mixtures thereof. The polymer molecular mass is controlled through feeding hydrogen. The ratio of hydrogen partial pressure to ethylene partial pressure is in the range of 0 to 50, preferably the range of 0 to 10. The polymer is isolated and dried in a fluidized bed dryer under nitrogen. The solvent may be removed through steam distillation in case of using high boiling solvents. Salts of long chain fatty acids may be added as a stabilizer. Typical examples are calcium-magnesium and zinc stearate.

Generally a cocatalyst such as alumoxane or alkyl aluminum or alkyl magnesium compound is also employed. Other suitable catalyst systems include Group 4 metal complexes of phenolate ether ligands.

In general, the polyethylene particles present in the composition of the present disclosure have an average particle size, $D_{50}$, between about 300 and about 1500 μm, generally between about 300 and about 1000 μm, often between about 300 and about 800 μm. Typically, the polyethylene powder is composed of generally spherical particles and exhibits a relatively narrow particle size distribution, such that the powder has a span $(D_{90}-D_{10}/D_{50})$ of less than 1.5, such about 0.2 to about 1.4, for example about 0.4 to about 1.3.

The polyethylene powder particle size measurements referred to herein are obtained by a laser diffraction method according to ISO 13320.

The polyethylene composition of the present disclosure generally has dry flow properties. For instance, the composition can flow through a 15 mm nozzle in a period of no more than about 15 seconds, such as no more than about 13 seconds, when tested according to Test DIN EN ISO 6186.

As described above, the polymer composition of the present disclosure can have a multi-modal molecular weight distribution and can include, in one embodiment, a relatively high molecular weight component combined with a relatively low molecular weight component. In one embodiment, for instance, the relatively high molecular weight component may comprise an ultrahigh molecular weight polyethylene (UHMW-PE) having an average molecular weight of at least or greater than 3,000,000 g/mol, such as at least about 3,200,000 g/mol, such as at least about 3,400,000 g/mol, such as greater than about 3,600,000 g/mol, such as greater than about 3,800,000 g/mol, such as greater than about 4,000,000 and generally less than about 20,000,000 g/mol, such as less than about 15,000,000 g/mol, such as less than about 12,000,000 g/mol, such as less than about 10,000,000 g/mol, such as less than about 7,500,000 g/mol, such as less than about 6,000,000 g/mol. As used herein, average molecular weight is determined according to the Margolies' equation. More particularly, the viscosity number of the polymer is first determined according to Test DIN EN ISO 1628-3. Dry powder flow is measured using a 25 mm nozzle according to Test DIN EN ISO 6186. The viscosity number is proportional to molecular weight. The Margolies' equation is then applied for calculating the molecular weight from the viscosity number using Test DIN EN ISO 1628-3.

In addition to having a relatively high molecular weight, the UHMW-PE polymer can also have a relatively high bulk density as measured according to DIN53466 or ISO 60. For instance, in one embodiment, the bulk density is generally greater than about 0.3 g/cm$^3$, such as greater than about 0.35 g/cm$^3$, such as greater than about 0.4 g/cm$^3$, such as greater than about 0.43 g/cm$^3$. The bulk density is generally less than about 0.6 g/cm$^3$.

The relatively high molecular weight polyethylene can also have a density of greater than about 0.9 g/cm$^3$, such as greater than about 0.91 g/cm$^3$, such as greater than about 0.92 g/cm$^3$. The density is generally less than about 0.98 g/cm$^3$.

The relatively high molecular weight polyethylene component can generally be present in the composition in an amount greater than about 50% by weight in relation to all of the polyethylene polymers present in the composition. For instance, the relatively high molecular weight polyethylene component can be present in an amount greater than about 55% by weight, such as in an amount greater than about 60% by weight, such as in an amount greater than about 65% by weight, such as in an amount greater than about 70% by weight, such as in an amount greater than about 75% by weight, such as in an amount greater than about 80% by weight, such as in an amount greater than about 85% by weight. The relatively high molecular weight polyethylene component is generally present in the composition in an amount less than about 99% by weight, such as in an amount less than about 98% by weight, such as in an amount less than about 95% by weight, such as in an amount less than about 90% by weight, such as in an amount less than about 85% by weight.

The polymer composition can contain at least one relatively low molecular weight component. The relatively low molecular weight component, for instance, may comprise a polyethylene polymer having a molecular weight of from about 100,000 g/mol to about 2,000,000 g/mol. For instance, the relatively low molecular weight component may comprise a high molecular weight polyethylene or a very high molecular weight polyethylene. "High molecular weight polyethylene" refers to polyethylene compositions with weight-average molecular weight of at least about $3 \times 10^5$ g/mol and, as used herein, is intended to include very-high molecular weight polyethylene and ultra-high molecular weight polyethylene. For purposes of the present specification, the molecular weights referenced herein are determined in accordance with the Margolies' equation ("Margolies' molecular weight").

"Very-high molecular weight polyethylene" refers to polyethylene compositions with a weight average molecular weight of less than about $3 \times 10^6$ g/mol and more than about $1 \times 10^6$ g/mol. In some embodiments, the molecular weight of the very-high molecular weight polyethylene composition is between about $2 \times 10^6$ g/mol and less than about $3 \times 10^6$ g/mol.

In still another embodiment, the relatively low molecular weight polyethylene may comprise a high density polyethylene.

In general, the average molecular weight of the relatively low molecular weight component is generally less than about 1,500,000 g/mol, such as less than about 800,000 g/mol, such as less than about 600,000 g/mol, such as less than about 500,000 g/mol, such as less than about 450,000 g/mol. The average molecular weight of the relatively low molecular weight component is generally greater than about 100,000 g/mol, such as greater than about 200,000 g/mol, such as greater than about 300,000 g/mol. The relatively low molecular weight component may comprise polyethylene particles having an average particle size (d50) of generally greater than about 50 microns, such as greater than about 80 microns, such as greater than about 100 microns, such as greater than about 120 microns, such as greater than about 150 microns, such as greater than about 180 microns. The average particle size of the relatively low molecular weight component, in one embodiment, can be less than about 600 microns, such as less than about 400 microns, such as less than about 300 microns.

In one embodiment, in addition to having a multi-modal molecular weight distribution, the polymer composition can also have a multi-modal average particle size distribution. For instance, in one embodiment, the relatively low molecular weight component can comprise particles having an average particle size that is less than the average particle size of the relatively high molecular weight component. For example, in one embodiment, the relatively low molecular weight component can have an average particle size of less than about 400 microns while the relatively high molecular weight component can have an average particle size of greater than 400 microns.

The relatively low molecular weight polyethylene component is generally present in the composition in an amount less than 50% by weight based upon the total weight of the polyethylene polymers present. For instance, the lower molecular weight component can be present in the composition in an amount less than about 45% by weight, such as in an amount less than about 40% by weight, such as in an amount less than about 35% by weight, such as in an amount less than about 30% by weight, such as in an amount less than about 25% by weight, such as in an amount less than about 20% by weight, such as in an amount less than about 15% by weight. The low molecular weight component is generally present in an amount greater than about 1% by weight, such as in an amount greater than about 2% by weight, such as in an amount greater than about 5% by weight, such as in an amount greater than about 10% by weight, such as in an amount greater than about 15% by weight.

The polymer composition and polymer articles made in accordance with the present disclosure may contain various other additives, such as heat stabilizers, light stabilizers, UV absorbers, flame retardants, lubricants, colorants, and the like.

In one embodiment, a heat stabilizer may be present in the composition. The heat stabilizer may include, but is not limited to, phosphites, aminic antioxidants, phenolic antioxidants, or any combination thereof.

In one embodiment, an antioxidant may be present in the composition. The antioxidant may include, but is not limited to, secondary aromatic amines, benzofuranones, sterically hindered phenols, or any combination thereof.

In one embodiment, a light stabilizer may be present in the composition. The light stabilizer may include, but is not limited to, 2-(2'-hydroxyphenyl)-benzotriazoles, 2-hydroxy-4-alkoxybenzophenones, nickel containing light stabilizers, 3,5-di-tert-butyl-4-hydroxybenzoates, sterically hindered amines (HALS), or any combination thereof.

In one embodiment, a UV absorber may be present in the composition in lieu of or in addition to the light stabilizer. The UV absorber may include, but is not limited to, a benzotriazole, a benzoate, or a combination thereof, or any combination thereof.

In one embodiment, a halogenated flame retardant may be present in the composition. The halogenated flame retardant may include, but is not limited to, tetrabromobisphenol A (TBBA), tetrabromophthalic acid anhydride, dedecachloropentacyclooctadecadiene (dechlorane), hexabromocyclodedecane, chlorinated paraffins, or any combination thereof.

In one embodiment, a non-halogenated flame retardant may be present in the composition. The non-halogenated flame retardant may include, but is not limited to, resorcinol diphosphoric acid tetraphenyl ester (RDP), ammonium polyphosphate (APP), phosphine acid derivatives, triaryl phosphates, trichloropropylphosphate (TCPP), magnesium hydroxide, aluminum trihydroxide, antimony trioxide.

In one embodiment, a lubricant may be present in the composition. The lubricant may include, but is not limited to, silicone oil, waxes, molybdenum disulfide, or any combination thereof.

In one embodiment, a colorant may be present in the composition. The colorant may include, but is not limited to, inorganic and organic based color pigments.

These additives may be used singly or in any combination thereof. In general, unless stated otherwise, if the additives are utilized, they may be present in an amount of at least about 0.05 wt. %, such as at least about 0.1 wt. %, such as at least about 0.25 wt. %, such as at least about 0.5 wt. %, such as at least about 1 wt. % and generally less than about 20 wt. %, such as less than about 10 wt. %, such as less than about 5 wt. %, such as less than about 4 wt. %, such as less than about 2 wt. %. The sum of the wt. % of all of the components, including any additives if present, utilized in the polymer composition will be 100 wt. %.

Once the polymer composition is formulated, the resulting granular product can be used to form porous articles through a sintering process. Porous articles may be formed by a free sintering process which involves introducing the polyethylene polymer powder described above into either a partially or totally confined space, e.g., a mold, and subjecting the molding powder to heat sufficient to cause the polyethylene particles to soften, expand and contact one another. Suitable processes include compression molding and casting. The mold can be made of steel, aluminum or other metals. The polyethylene polymer powder used in the molding process is generally ex-reactor grade, by which is meant the powder does not undergo sieving or grinding before being introduced into the mold. The additives discussed above may of course be mixed with the powder.

The mold is heated in a convection oven, hydraulic press or infrared heater to a sintering temperature between about 140° C. and about 300° C., such as between about 160° C. and about 300° C., for example between about 170° C. and about 240° C. to sinter the polymer particles. The heating time and temperature vary and depend upon the mass of the mold and the geometry of the molded article. However, the heating time typically lies within the range of about 25 to about 100 minutes. During sintering, the surface of individual polymer particles fuse at their contact points forming a porous structure. Subsequently, the mold is cooled and the porous article removed. In general, a molding pressure is not required. However, in cases requiring porosity adjustment, a proportional low pressure can be applied to the powder.

Porous substrates made in accordance with the present disclosure have been found to have an excellent blend of properties. For instance, porous substrates made in accordance with the present disclosure can have a relatively low pressure drop, indicating excellent filter properties, in combination with a relatively high level of flexural strength, indicating a product that is less brittle and more flexibility. For instance, porous substrates made according to the present disclosure can have a pressure drop of less than 10 mbar, such as less than about 8 mbar, such as less than about 6 mbar, such as even less than about 4 mbar. In one embodiment, for instance, the pressure drop can be from about 0.1 mbar to about 3.5 mbar.

In addition, the porous substrate can have relatively high flexural strength. Flexural strength, for instance, can be determined in accordance with DIN ISO 178. The flexural strength of porous substrates made according to the present disclosure can generally be greater than about 1.5 MPa, such as greater than about 2 MPa, such as greater than about 2.2 MPa, such as greater than about 2.4 MPa, such as greater than about 2.6 MPa, such as greater than about 2.8 MPa, such as greater than about 3 MPa. The flexural strength is generally less than about 8 MPa.

In addition to the above properties, porous substrates made according to the present disclosure can have various other beneficial physical properties. For instance, the porous substrates can have a porosity of greater than about 30%, such as greater than about 35%, such as greater than about 40%. The porosity is generally less than about 80%, such as less than about 60%, such as less than about 55%. Porosity can be determined according to DIN Test 66133. Average pore size which can also be determined according to Test DIN 66133 can generally be greater than about 80 microns, such as greater than about 85 microns, such as greater than about 90 microns, such as greater than about 95 microns, such as greater than about 100 microns, such as greater than about 105 microns, such as greater than about 110 microns, such as greater than about 115 microns, such as greater than about 120 microns, such as even greater than about 125 microns. The average pore size is generally less than about 180 microns.

Porous substrates made according to the present disclosure can be used in numerous and diverse applications. Specific examples include wastewater aeration, capillary applications and filtration.

Aeration is the process of breaking down wastewater using microorganisms and vigorous agitation. The microorganisms function by coming into close contact with the dissolved and suspended organic matter. Aeration is achieved in practice by the use of "aerators" or "porous diffusers". Aerators are made from many different materials and come in a few widely accepted shapes and geometries. The three main types of materials currently used in the manufacture of aerators are ceramics (including aluminum oxide, aluminum silicates and silica), membranes (mostly elastomers like ethylene/propylene dimers-EPDM and plastics (mostly HDPE).

The present porous articles provide attractive replacements for ceramic, membrane and HDPE aerators due to the fact the tighter control on particle size distribution and bulk density leads to the production of aerators with tightly controlled pores, consistent flow rates, larger bubble sizes and lower pressure drops. In addition, the incorporation UV stabilizer and/or antimicrobial additives should allow the performance of the present sintered porous polyethylene aerators to be further improved beyond that of existing aerators. Thus, the incorporation of UV stabilizers can be used to extend the life expectancy of the present aerators in outdoor environments, whereas the addition of antimicrobial agents should prevent fouling on the aerator surface, thereby allowing the aerators to perform at peak efficiency for longer periods.

Capillary applications of the present porous sintered articles include writing instruments, such as highlighters, color sketch pens, permanent markers and erasable whiteboard markers. These make use of the capillary action of a porous nib to transport ink from a reservoir to a writing surface. Currently, porous nibs formed from ultra-high molecular weight polyethylene are frequently used for highlighters and color sketch pens, whereas permanent and whiteboard markers are generally produced from by polyester (polyethylene terephthalate), polyolefin hollow fibers and acrylic porous materials. The large pore size of the present sintered articles make them attractive for use in the capillary transport of the alcohol-based high-viscosity inks employed in permanent markers and white board markers.

With regard to filtration applications, the present porous sintered articles are useful in, for example, produced water (drilling injection water) filtration. Thus, in crude oil production, water is often injected into an on-shore reservoir to maintain pressure and hydraulically drive oil towards a producing well. The water being injected has to be filtered so that it does not prematurely plug the reservoir or equipment used for this purpose. In addition as oil fields mature, the generation of produced water increases. Porous tubes made from the present polyethylene powder are ideal filtration media for produced water filtration because they are oleophilic, they can form strong and stable filter elements which are back-washable, abrasion resistant, chemically resistant and have a long service life.

The present porous sintered articles also find utility in other filtration applications, where oil needs to be separated from water, such as filtration of turbine and boiler water for power plants, filtration of cooling water emulsions, de-oiling of wash water from car wash plants, process water filtration, clean-up of oil spills from seawater, separating glycols from natural gas and aviation fuel filters.

Another application of the present porous sintered articles is in irrigation, where filtration of incoming water is necessary to remove the tiny sand particles that can clog sprinkler systems and damage other irrigation devices including pumps. The traditional approach to this issue has been the use of stainless steel screens, complex disc filters, sand media filters and cartridge filters. One of the key requirements of these filters is pore size, which is normally required to range from 100μ to 150μ. Other considerations are high flow rate, low pressure drop, good chemical resistance, high filter strength and long service life. The properties of the present porous sintered articles make them particularly qualified for such use.

A further filtration application is to replace the sediment filters used as pre-filters to remove rust and large sediments in multi-stage drinking water applications where sintered polyethylene filters have shown extended life over the more expensive carbon blocks, reverse osmosis membranes and hollow fiber cartridges. Until now the required sintered part strength of such filters was achievable only by blending LDPE or HDPE together with UHMWPE powder. However, these blends suffer from a number of disadvantages in that the pore size of the sintered filter is reduced and existing UHMWPE powders are unable to produce filters with pore sizes greater than 20μ and with adequate part strength. In contrast, the present polyethylene powder facilitates the design of sediment filters which exhibit adequate part strength at pore sizes >30μ and which show superior pore size retention during use at high water velocities.

Other filtration applications of the present porous sintered articles include medical fluid filtration, such as filtration of blood outside the human body, filtration to remove solids in chemical and pharmaceutical manufacturing processes, and filtration of hydraulic fluids to remove solid contaminants.

In a further filtration embodiment, the present polyethylene powder can be used in the production of carbon block filters. Carbon block filters are produced from granular activated carbon particles blended with about 5 wt % to about 80 wt %, generally about 15 wt % to about 25 wt % of a thermoplastic binder. The blend is poured into a mould, normally in the shape of a hollow cylinder, and compressed so as to compact the blended material as much as possible. The material is then heated to a point where the binder either softens or melts to cause the carbon particles to adhere to one another. Carbon block filters are used in a wide variety of applications, including water filtration, for example, in refrigerators, air and gas filtration, such as, the removal of toxic organic contaminants from cigarette smoke, organic vapor masks and gravity flow filtration devices.

The present disclosure may be better understood with reference to the following examples.

EXAMPLE

The following example demonstrates some of the advantages and benefits of the present disclosure.

Various samples were formulated, formed into porous substrates, and tested for various properties. The following tests were conducted:

Average particle sizes (d50) were measured by a laser diffraction method according to ISO Test 13320. Particle size measurements are weighted average values.

Pressure drop values were measured using a sample of the porous substrate. The sample has a diameter of 140 mm and a width of from 6.2 mm to 6.5 mm (depending on shrinkage). The pressure drop is measured under an airflow rate of 7.5 m³/hr. The drop in pressure is measured across the width of the sample.

The average or mean pore size of the sample and the porosity of the sample are both determined according to DIN Test 66133. Porosity values are determined by mercury intrusion porosimetry.

Flexural strength is determined in accordance with DIN ISO Test 178.

Seven polyethylene compositions were formulated containing different molecular weight distributions. Some of the formulations had a mono-modal molecular weight distribution while other formulations had a bi-modal molecular weight distribution. The following formulations were prepared:

TABLE 1

| Sample No. | Molecular weight distribution (DIN Test 1628) |
|---|---|
| 1 | 100% by weight 7,400,000 g/mol (large particle size > 400 μm) |
| 2 | 90% by weight 7,400,000 g/mol and 10% by weight 400,000 g/mol |
| 3 | 80% by weight 7,400,000 g/mol and 20% by weight 400,000 g/mol |
| 4 | 80% by weight 7,400,000 g/mol and 20% by weight 500,000 g/mol |
| 5 | 100% by weight 1,300,000 g/mol |
| 6 | 100% by weight 2,800,000 g/mol (medium particle size > 150 μm and < 400 μm) |
| 7 | 100% by weight 3,500,000 g/mol (small particle size < 150 μm) |

The above samples made from polymer particles were then sintered and formed into porous substrates. The polyethylene particles were introduced into a mold and then subjected to heat sufficient to cause the polyethylene particles to soften, expand and contact one another. The mold was heated in a convection oven to a sintering temperature of 220° C. to sinter the polymer particles. The heating time was 30 mins.

The following results were obtained:

TABLE 2

| Sample No. | Pressure drop (mbar) | Mean Pore Size (micron) | Porosity (%) | Flexural Strength (MPa) |
|---|---|---|---|---|
| 1 | 3 | 130 | 47 | 1.7 |
| 2 | 2 | 135 | 47 | 1.5 |
| 3 | 3 | 126 | 44 | 2.6 |
| 4 | 13 | 92 | 44 | 3.3 |
| 5 | 3 | 95 | 48 | 1.8 |
| 6 | 10 | 50 | 44 | 2.5 |
| 7 | 35 | 29 | 40 | 2.6 |

As shown above, Sample No. 3 having a bi-modal molecular weight distribution produced porous substrates having dramatically improved flexural strength while still having excellent pressure drop characteristics.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A polymer article comprising:
a porous substrate comprising polyethylene particles sintered together, the polyethylene particles comprising polyethylene polymers having a multi-modal molecular weight distribution and a multi-modal average particle size distribution, from about 70% by weight to about 90% by weight of the polyethylene polymers having a molecular weight of greater than about 4,700,000 g/mol and wherein from about 10% by weight to about 30% by weight of the polyethylene polymers have a molecular weight of from about 300,000 g/mol to about 500,000 g/mol, the porous substrate having a flexural strength of greater than about 2 MPa, a pressure drop of less than about 4 mbar, and a mean pore size of from about 50 microns to about 300 microns when tested according to DIN Test 66133; and
wherein the polyethylene polymer having a molecular weight greater than about 4,700,000 g/mol has an average particle size of greater than 400 microns and wherein the polyethylene polymer having a molecular weight of from about 300,000 g/mol to about 500,000 g/mol has an average particle size of less than 400 microns.

2. A polymer article as defined in claim 1, wherein the porous substrate displays a pressure drop of less than about 3.5 mbar.

3. A polymer article as defined in claim 1, wherein from about 70% by weight to about 90% by weight of the polyethylene polymers have a molecular weight greater than about 5,000,000 g/mol.

4. A polymer article as defined in claim 1, wherein the polyethylene polymer having a molecular weight greater than 4,700,000 g/mol comprises a metallocene-catalyzed polyethylene polymer.

5. A polymer article as defined in claim 1, wherein the polyethylene polymer having a molecular weight of from about 300,000 g/mol to about 500,000 g/mol comprises a Ziegler-Natta catalyzed polyethylene polymer.

6. A polymer article as defined in claim 5, wherein the Ziegler-Natta catalyzed polyethylene polymer has a bulk density of from about 0.36 $g/cm^3$ to about 0.54 $g/cm^3$.

7. A polymer article as defined in claim 5, wherein the polyethylene polymer having a molecular weight greater than 4,700,000 g/mol comprises a metallocene-catalyzed polyethylene polymer.

8. A polymer article as defined in claim 1, wherein the porous substrate has a mean pore size of from about 80 microns to about 200 microns.

9. A polymer article as defined in claim 1, wherein the porous substrate has a porosity of from about 30% to about 60%.

10. A polymer article as defined in claim 1, wherein the porous substrate has a flexural strength of from about 2.3 MPa to about 8 MPa.

11. An aerator for wastewater comprising the polymer article as defined in claim 1.

12. A nib for a writing instrument comprising the polymer article as defined in claim 1.

13. A filter element comprising the polymer article as defined in claim 1.

* * * * *